L. S. BACHE.
ANTIFRICTION BEARING AND METHOD OF PRODUCING SAME.
APPLICATION FILED APR. 24, 1915.

1,174,942.

Patented Mar. 7, 1916.

2 SHEETS—SHEET 1.

Witnesses:
J. Clyde Tipley
Kate Brennan

Inventor
Leigh S. Bache,
By his Attorney
C. H. Baker.

L. S. BACHE.
ANTIFRICTION BEARING AND METHOD OF PRODUCING SAME.
APPLICATION FILED APR. 24, 1915.

1,174,942.

Patented Mar. 7, 1916.
2 SHEETS—SHEET 2.

Witnesses:

Inventor
Leigh S. Bache,
By his Attorney

UNITED STATES PATENT OFFICE.

LEIGH S. BACHE, OF MIDDLESEX, NEW JERSEY, ASSIGNOR TO THE GRAPHITE LUBRICATING COMPANY, OF BOUNDBROOK, NEW JERSEY, A CORPORATION OF NEW JERSEY.

ANTIFRICTION-BEARING AND METHOD OF PRODUCING SAME.

1,174,942.

Specification of Letters Patent.

Patented Mar. 7, 1916.

Application filed April 24, 1915. Serial No. 23,617.

*To all whom it may concern:*

Be it known that I, LEIGH S. BACHE, a citizen of the United States, and a resident of Middlesex, in the county of Middlesex and State of New Jersey, have invented certain new and useful Improvements in Anti-friction-Bearings and Methods of Producing Same, of which the following is a full, clear, and exact description, whereby any one skilled in the art may make and use the same.

The invention relates to anti-friction bearings of a composite type, that is, bearings having two distinctively different materials arranged in close juxtaposition to form a bearing surface.

It also relates to the method of producing said bearings.

The object of the invention is to provide a bearing, one portion of which may be formed with interlocking retainers for an anti-friction substance which has been introduced in units.

A further object is to provide a bearing which may be cast in a single piece with a central bore which is surrounded with pockets wider at their base than at their bearing surface and filling said pockets with inserts.

It is also an object to produce a metal and lubricating fiber bearing with the parts interlocked.

Figure 1:
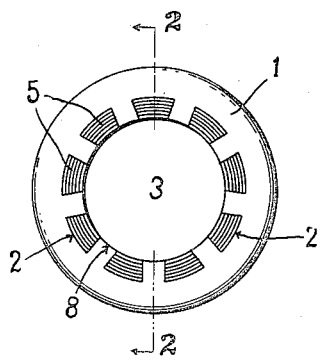
Figure 2:
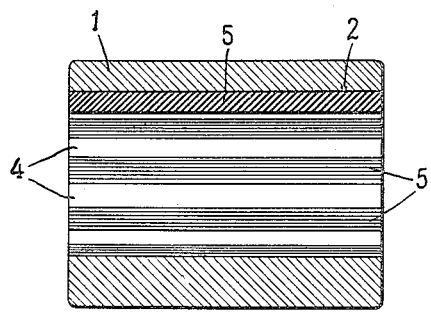
Figure 3:
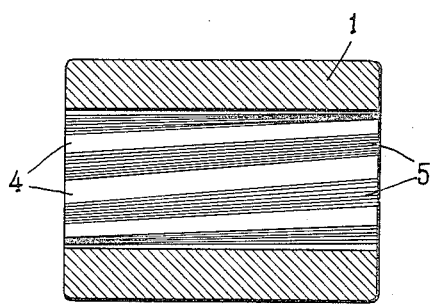
Figure 5:
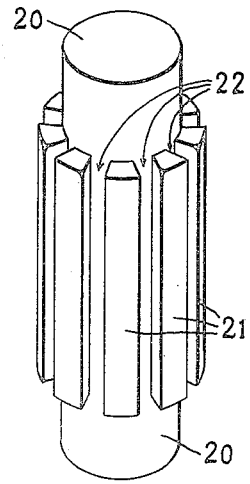
Figure 4:
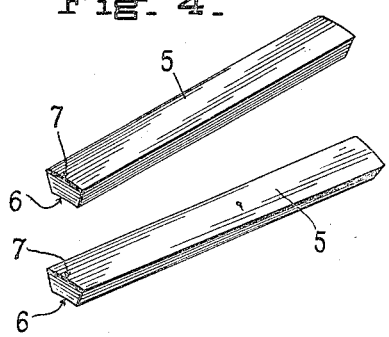
Figure 6:
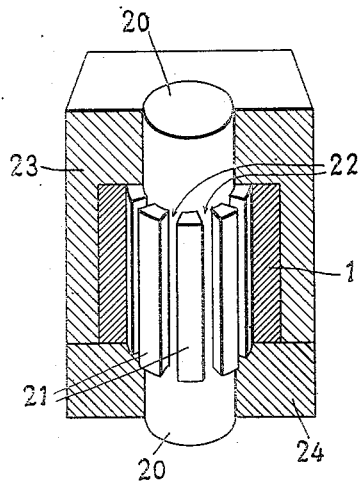
Figure 7:
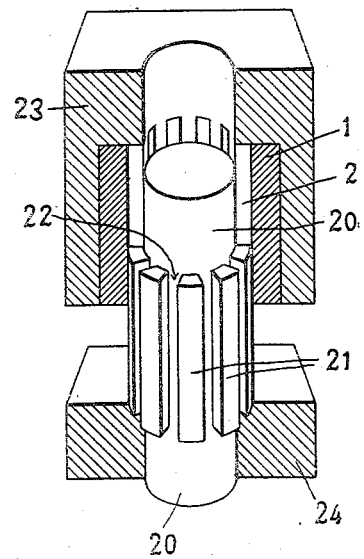

Referring to the drawings: Figure 1 is an end view of the bearing. Fig. 2 is a longitudinal section on the line 2—2 of Fig. 1. Fig. 3 is a similar sectional view showing an angular disposition of the longitudinal retaining pockets. Fig. 4 shows a form of insert for the straight line retainers and also an insert for the spiral or angularly formed retainer pocket. Fig. 5 illustrates a core and mandrel upon which the metallic portion of the bearing may be formed. Fig. 6 illustrates a form of mold with the core or mandrel in place and the metal part of the bearing poured thereabout and broken in section. Fig. 7 illustrates the mandrel as driven out.

It is admittedly old in the art to form composite bearings by using metal of different characters for the main shell and the whole or parts of the bearing surface. It is also old in the art to use impregnated fiber and wood bearings in which the material is impregnated through and through with lubricants of one form or another to provide an anti-friction surface which is always self-lubricating. In the types of composite bearings, it has been a common practice to provide grooves of one form or another about the bearing surface or central bore which grooves have been commonly employed to hold a lubricant.

So far as known to applicant, it has been impossible to provide a perfect and practical combination of metal with fibrous self-lubricating members forming practically a homogeneous part of the whole structure. There have been many difficulties in the way of providing such a bearing. The fiber or wood could not be properly locked in the metal and the proper proportions of lubricating wood or fiber and metal could not be used and united to form a successful bearing. The invention herein described overcomes the many objections heretofore encountered and provides a complete bearing in which locking grooves may be readily formed in the metal, of a definite and accurate size and may be completely filled with inserts of impregnated fiber. The various elements when assembled and in place provide a complete bearing with a proper gage for its central bore. The exact form, number and disposition of the locking grooves is of course, one which may be determined to suit any particular type of bearing desired but in any instance, the metal is practically cast to form, with reference to the inserts.

In the accompanying drawings, 1 denotes the metallic shell which may be of any desired type or composition of metal, bronze or babbitt, as the latter is very well adapted for use in conjunction with the self-lubricating inserts. The shell is formed with a series of longitudinally extending locking grooves 2 which, as illustrated in the drawings are of the general form of a locking key in cross-section. These openings or grooves 2 may extend axially of the bearing and in direct parallel line with the axis thereof, as illustrated in Figs. 1 and 2 or they may be angularly disposed as a spiral of long pitch, as illustrated in Fig. 3. In either case, they immediately surround the central bore 3 and open thereinto so that there is a solid wall 4 of broken cylindrical form between the several grooves. Fitting closely within the grooves 2 are inserts 5 which may be of an entirely different character of material from the body of the bearing 1. It has been found that inserts formed of a saturated wood or fiber such as described in my co-pending application Serial No. 845,084, filed June 15th, 1914, are particularly efficacious, although, of course, the inserts might be made of any proper lubricating material which has body and substance enough to be formed as a unit and which may be forcibly compressed into the grooves from their ends.

It will be noted that the wearing face of the inserts as at 6 is considerably narrower than the base of the inserts as at 7 and this provides a comparatively wide bearing face of metal 8 between the adjacent inserts. The arrangement also has additional advantages to those of mere surface contact. An unusually strong bearing may be formed as the metal portions are not substantially weakened, being always backed up by the inserts which, from their very key type or cross-section tend to strengthen the whole structure. Furthermore, where the lubricated wood or fiber is employed, as a sufficient amount of heat is developed, to withdraw a thin film of lubricant from the fiber, any undue friction ceases and there is no further boiling out or disturbance of the lubricant in the fibrous units. By having these substantially deep and wide at their rear ends, the heat which may be developed sufficiently to withdraw a film of lubricant is more evenly distributed throughout the mass of the inserts and throughout the intermediate bodies of metal. Of course, babbitt is recognized as a slippery metal but it is not sufficient in itself to prevent frictional heats. With the addition of the lubricating fibrous inserts it provides a perfect antifriction surface. A fine film of lubricant will be drawn from the saturated inserts and passed over the intermediate metallic portions of the babbitt and thus the whole bearing surface will be perfectly and thoroughly lubricated to just a sufficient degree to prevent further heating. Therefore, there is no undue exhaustion of the lubricating materials of the fiber.

In order to secure absolute registration and solidity of formation, it has been found, that babbitt or any similar metal, which is used for the bearing shell, may be poured about a core such as illustrated in Figs. 5 to 7 of the drawing. This core in practice may be of wood or any suitable core material or even metal and of course, has a central barrel portion 20 which is surrounded by members 21 corresponding in size and shape to the grooves which it is desired to form in the finished bearing. The central core portion 22 between the members 21 is of the diameter which it is desired to provide for the central bore of the bushing or bearing. This core is supported in any desired and ordinary manner and is surrounded by the outer portion of the mold 23. When the molds are properly assembled with their cores, the metal is poured therein and before the metal has had an opportunity of thoroughly chilling and hardening, the upper end of the core-member 20 is given a sharp blow and it is driven out through the bottom of the mold and core-support 24. This driving of the core out of the metal before it has thoroughly congealed, routs the grooves 2 leaving them of a uniform size and with nicely finished walls. The inserts, as illustrated in Fig. 4, are formed from the fibrous material and by any suitable mechanism are inserted into the ends of the grooves thus formed in the metal shell and put down under sufficient pressure to drive them snugly into the grooves so that they will completely fill said grooves. The bearing may of course, be rebored, ground or treated in any desired mechanical manner, although for ordinary purposes, it has been found that great accuracy can be maintained by the above described method of forming and comparatively no finishing is required, at any rate, for the interior bore. It is of course my theory that the molten metal when striking the core, is slightly chilled adjacent to the core and with the residual heat of the balance of the casting, it is quite feasible to drive the mandrel or core out of the casting at the same time, routing it and giving it a perfect finish as to its central bore and surrounding retaining grooves. Thereupon, with a substantially even shrinkage, the fibrous inserts are positively and permanently bound into the structure. In effect, there is a homogeneous structure composed of two entirely different materials which could not ordinarily be united in a permanent form.

Obviously, the exact form of the grooves is not material so long as they have a locking effect on the fiber, although I have found that the form shown and described appears to have particular merit in use as bearings formed in this manner have stood most unusual tests even under the hardest wear and usage.

What I claim as my invention and desire to secure by Letters Patent is:

1. The method of producing anti-friction bearings consisting of pouring molten metal into a mold having a core provided with a series of longitudinal ribs, driving out said core before the molten metal has cooled, thereby providing a central bore and a series of longitudinal grooves in the casting and subsequently filling said grooves by forcing therein lubricating inserts.

2. The method of producing anti-friction bearings consisting of pouring molten metal into a mold having a core provided with a series of longitudinal ribs, driving out said core before the molten metal has cooled, thereby providing a central bore and a series of longitudinal grooves in the casting and subsequently filling said grooves by forcing therein lubricating inserts, conforming to and filling said grooves.

3. The method of producing anti-friction bearings which consists in pouring a molten metal for the shell into a mold having a core provided with a central portion forming the central bore, and with ribs wider at their outer periphery than adjacent to the body of the core, driving out said core before said metal is cooled and solidified to provide a shell having locking grooves for lubricating inserts and introducing inserts fitting said grooves.

4. A method of forming bearing shells which consists of pouring a molten metal into a mold having a core forming the central bore of the cast shell and with peripheral ribs to provide grooves in said shell and driving out said core from the metal before it has completely congealed and cooled.

5. A bearing consisting of a shell having a series of longitudinally extending undercut grooves formed by casting molten metal about a core and driving out said core before said cast metal has cooled and shrunk and inserts of lubricating material forced into and filling said grooves formed by the core.

LEIGH S. BACHE.

Witnesses:
  GEO. T. SMALLEY,
  WM. F. JENNINGS.

Copies of this patent may be obtained for five cents each, by addressing the "Commissioner of Patents, Washington, D. C."